(12) United States Patent
Grosso et al.

(10) Patent No.: US 6,718,878 B2
(45) Date of Patent: *Apr. 13, 2004

(54) AUTOMATIC DETECTION OF BLACK AND WHITE PAGES IN A COLOR DOCUMENT STREAM

(75) Inventors: Marc Raymond Grosso, Fairport, NY (US); Craig D. Woodward, Victor, NY (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 146 days.

(21) Appl. No.: 09/408,233

(22) Filed: Sep. 29, 1999

(65) Prior Publication Data

US 2002/0005134 A1 Jan. 17, 2002

(51) Int. Cl.[7] .................................................. B41L 47/58
(52) U.S. Cl. ....................................... 101/484; 101/211
(58) Field of Search ................................. 101/484, 483, 101/401, 401.1, DIG. 46, 211 V; 382/136, 165, 162, 244, 164; 347/43; 358/1.1, 1.2, 515

(56) References Cited

U.S. PATENT DOCUMENTS

| 5,181,257 | A | * | 1/1993 | Steiner et al. ............... 101/211 |
| 5,287,204 | A | * | 2/1994 | Koizumi et al. ............. 358/538 |
| 5,343,312 | A | * | 8/1994 | Hibi et al. ................... 358/520 |
| 5,537,190 | A | * | 7/1996 | Folkins et al. ............... 355/214 |
| 5,649,024 | A | | 7/1997 | Goldsmith ................... 382/170 |
| 5,678,133 | A | * | 10/1997 | Siegel ........................... 399/67 |
| 5,786,906 | A | | 7/1998 | Shishizuka |
| 5,911,004 | A | | 6/1999 | Ohuchi et al. |
| 5,973,804 | A | | 10/1999 | Yamada |
| 6,064,492 | A | * | 5/2000 | Eldridge et al. ............ 358/1.15 |
| 6,118,895 | A | * | 9/2000 | Hirota et al. ................ 382/165 |
| 6,148,102 | A | * | 11/2000 | Stolin .......................... 382/164 |
| 6,226,397 | B1 | * | 5/2001 | Yamagata ..................... 382/162 |
| 6,327,043 | B1 | * | 12/2001 | Rumph et al. .............. 358/1.15 |
| 6,327,382 | B1 | * | 12/2001 | Kaneda et al. .............. 382/164 |
| 6,377,703 | B1 | | 4/2002 | Yeung |

FOREIGN PATENT DOCUMENTS

EP          91311975.6          12/1991

* cited by examiner

Primary Examiner—Anthony H. Nguyen
(74) Attorney, Agent, or Firm—Fay, Sharpe, Fagan, Minnich & McKee, LLP

(57) ABSTRACT

An approach is provided for identifying black and white pages in a color document stream. This approach may be utilized in digital printing systems. This approach examines a small portion of the color data for a page to identify whether the color data is indicative of the page being a black and white page or a full color page. This approach also examines the relative sizes of compressed color separations for the pages. Pages that are determined to be black and white pages may be printed in a black and white mode, whereas full color pages may be printed in a full color page mode.

7 Claims, 3 Drawing Sheets

AUTOMATIC DETECTION OF BLACK AND WHITE PAGES IN A COLOR DOCUMENT STREAM

TECHNICAL FIELD

The present invention relates generally to printing technologies and more particularly to automatic detection of black and white pages in a color document stream for printing.

BACKGROUND OF THE INVENTION

Conventional printing systems often include a digital front end (DFE) or a printer server. The DFE or print server is a computer system that performs some processing on print jobs and distributes the processed print jobs to one or more printers for printing. Often times, a print job contains a document that is encoded in a page description language, such as PCL or Postscript. The DFE or print server has an interpreter for interpreting page description language commands contained in the document to produce color data for the pixels representing the image of each page. This color data may be passed to a printer to produce a printed version of the page. If the document is a color document, the interpreter produces four color separations for each page: a cyan color separation, a magenta color separation, a yellow color separation and a black color separation. Each color separation is matched with an ink color and contains color data for each pixel specifying how much of the color associated with the color separation is to be used for coloring the pixel. The ink colors may be combined to produce a roughly infinite variety of colors. The ink colors have a subtractive effect relative to each other, where each layer of ink removes a color from light reflected by the printing substrate. For example, yellow removes the blue light components reflected from a white paper substrate. Each color separation holds color data for each pixel on the page. The data may identify what amount of the color associated with the color separation is to be combined with the other colors associated with the color separations to produce a desired color.

With conventional printing systems, the interpreter does not report when a black and white page (i.e. a monochromatic page) is found within a color document. As a result, all of the pages are treated as color pages during printing. Color pages typically require four printing passes, where each printing pass is associated with a specified color (e.g., cyan, magenta, yellow or black). In contrast, a black and white page requires only a single printing pass. Hence, where a black and white page appears in a color document, the black and white page is printing with four printing passes rather than one printing pass. This conventional approach is both time consuming and wasteful of storage space.

SUMMARY OF THE INVENTION

The present invention addresses the above-described limitation of conventional printing systems by providing a device, such as a DFE or a print server, that is able to recognize black and white pages in a color document. The device designates the black and white pages in a color document so that the designated pages may be printed in a black and white mode rather than in a color mode. The color pages are still printed in a color mode. Thus, the document is printed more efficiently without wasting printing resources.

In one embodiment, the present invention identifies whether a page is a black and white page by examining data within the color separations for the page. In particular, predetermined bytes within one of the cyan, magenta or yellow separations may be examined to determine if the bytes have zero values, indicating that there are no cyan, magenta or yellow components for the specified pixels. A black and white document has no color components other than a black color component. This embodiment also examines the respective sizes of the cyan, magenta and yellow color separations after linear compression to ensure that all of these compressed color separations are the same size. It would be expected, given a linear and lossless compression method, that a black and white document would produce compressed color separations of the same size, except for the black color separation. Lastly, this embodiment compares the size of the black color separation to the size of one of the other color separations. If the black color separation is larger and the other tests have been met, the page is determined to be a black and white page.

In accordance with one aspect of the present invention, a device is provided for processing a document having multiple pages with at least one black and white page and at least one full color page. The device includes an interface with at least one image output terminal to which the document may be sent to output the document. The device also includes an analyzer for analyzing each page of the document to determine whether the page is to be output in a black and white mode that is used for outputting monochromatic pages, or in a full color mode that is used for outputting full color pages. The device may be, for example, a digital front end or a print server.

In accordance with another aspect of the present invention, a method is practiced in an apparatus for processing documents prior to passing the documents to at least one image output terminal (IOT). The method processes a selected page of a mixed document that has at least one full color page and at least one black and white page. In accordance with this method, the color data in at least one of the color separations for the selected page is analyzed and a determination is made whether the selected page is a black and white page. Where the selected page is determined to be a black and white page, the selected page is designated for printing in a black and white mode. Where the selected page is determined not to be a black and white page, the selected page is designated to be printed in the full color mode. The method may include the step of decomposing the selected page into color separations. Moreover, the method may include the step of examining a selected portion of the color data in one of the separations to determine whether all the color data in the selected portion has the same value. The color separations may be compressed, and the sizes of the compressed color separations may be used to determine whether the selected page is a black and white page or a full color page.

BRIEF DESCRIPTION OF THE DRAWINGS

An illustrative embodiment of the present invention will be described below relative to the following drawings.

DETAILED DESCRIPTION OF THE INVENTION

The illustrative embodiment of the present invention allows a digital front end (DFE) to identify black and white pages in a mixed document that contains both color pages and black and white pages. The identified black and white pages may be printed using a more efficient black and white process while the color pages are still printed using a color printing process.

The illustrative embodiment determines whether a page in a document is a black and white page by examining color data contained within the color separations for the page. The illustrative embodiment examines only a small portion of the color data to provide a fast and effective approach to identifying whether the page is a black and white page. The illustrative embodiment examines color data in a non-black color separation (i.e. cyan, magenta or yellow) of the page to determine whether all of the color data has a value of zero (indicating that there are no color components other than black). If this test is satisfied, the illustrative embodiment examines the compressed color separations to determine whether all of the non-black color separations are the same size. If all of the compressed non-black color separations are the same size, one of the non-black compressed color separations (e.g., cyan) is compared to the black compressed color separation to determine whether the black compressed color separation is larger. If the black color separation is larger, it is concluded that the page is a black and white page. Otherwise, it is concluded that the page is a full color page.

For purposes of the discussion below, it is helpful to define a few terms.

A "black and white page" is a page that contains only black and white color components.

A "color page" or a "full color page" is a page that contains color components other than black and white components. A color page may be encoded in accordance with a CMYK color model or another color printing model.

A "document" is a logical collection of pages.

A "mixed document" is a document that contains at least one color page and at least one black and white page.

A "color separation" is a logical grouping of data regarding the coloring of pixels for a given color plane. A given color may be decomposed into single color layers (e.g., cyan, magenta, yellow and black) where each color layer is printed separately to produce a given color.

A "print job" is a logical grouping of information to be printed as a unit (e.g., a single document).

"Linear compression" is a method of compression which produces a repeatable and predictable output for similar and identical input.

Figure 1:
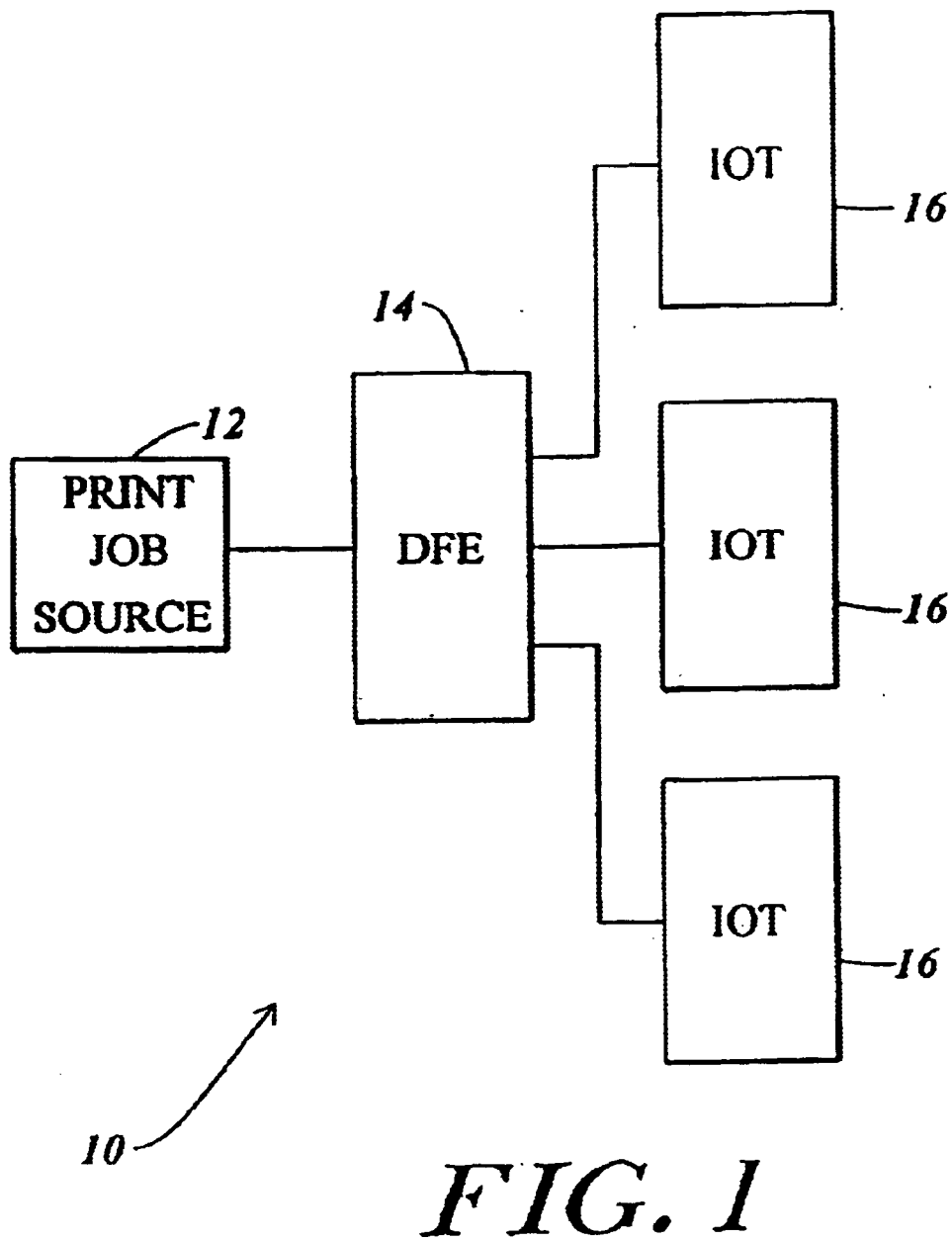
FIG. 1 is a block diagram illustrating components that are employed in the illustrative embodiment of the present invention.

FIG. 1 depicts a printing system 10 that is suitable for practicing the illustrative embodiment of the present invention. A document or other print job originates from a print job source 12. The print job source 12 may be a computer system, a storage device or other document source, such as a scanner. The print job source 12 provides a document that is forwarded to a digital front end (DFE) 14. Those skilled in the art will appreciate that the DFE 14 may be, instead, a print server. In general, the DFE may be substituted with a device that processes a document prior to the document being distributed for printing. The DFE 14 is a computer system having one or more processors for executing computer instructions. The computer instructions may be stored within storage along with data and other information. The DFE 14 is interfaced with one or more image output terminals (IOTs) 16. The IOTs 16 may be printers or other output devices that are capable of producing an output version of the image data that is passed from the DFE 14. The print job source 12, the DFE 14 and IOT 16 may be part of a common network, such as a local area network (LAN). Alternatively, these components may be part of different respective networks. For example, the print job source 12 may originate from a remote location and be passed to the DFE 14 that is part of a network with the IOT 16.

Those skilled in the art will appreciate that the configuration of the printing system 10 show in FIG. 1 is intended to be merely illustrative and not limiting of the present invention. The present invention may be practiced with other printing system configurations. More generally, the present invention may be practiced in an environment where it is necessary to automatically detect a black and white page in a color document stream.

Figure 2:
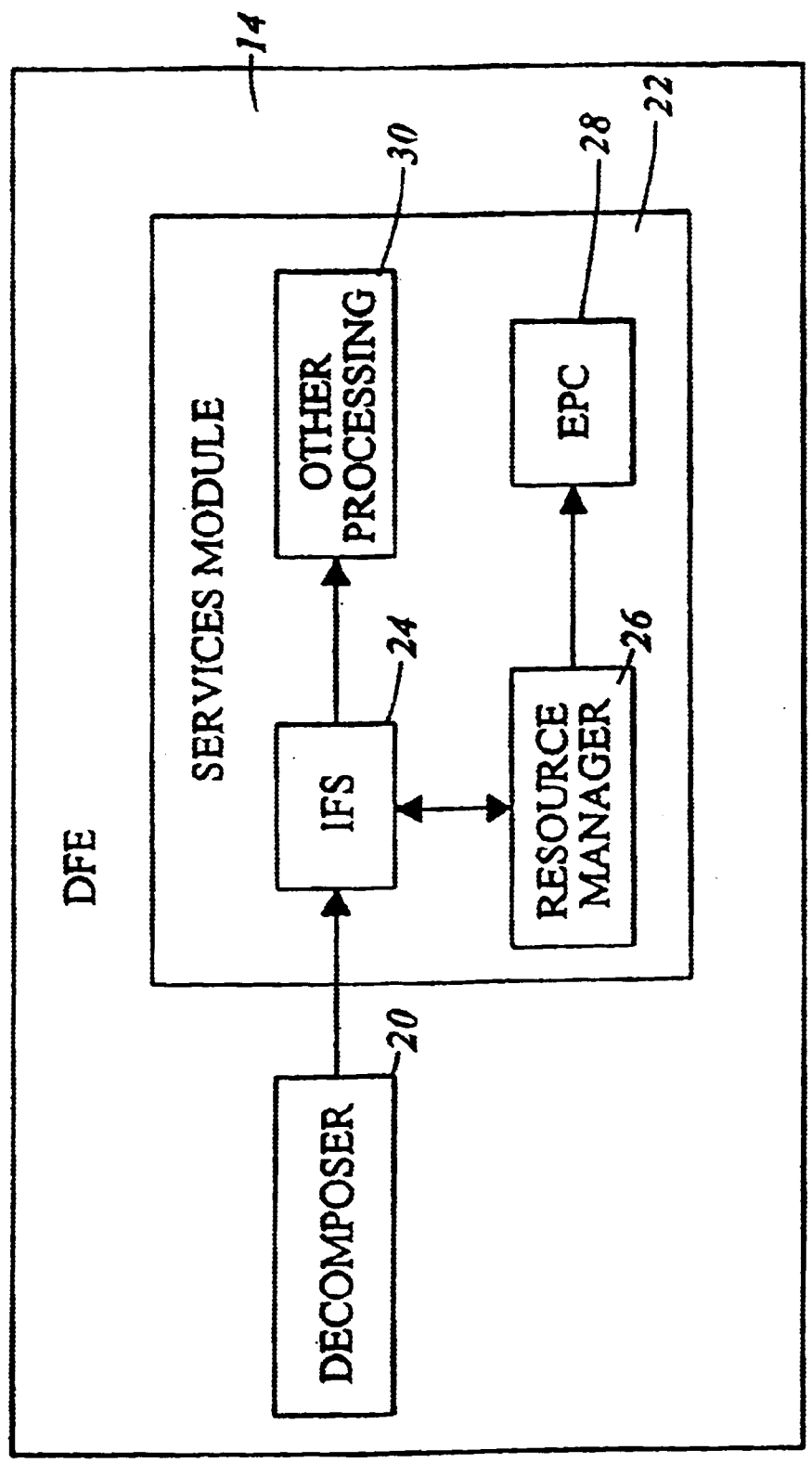
FIG. 2 is a block diagram illustrating major functional components of the DFE 14 of FIG. 1.

FIG. 2 depicts a number of the logical components of the DFE 14 in the illustrative embodiment of the present invention. The DFE 14 can include a decomposer 20 that decomposes incoming pages of a document into four color separations. The decomposer 20 may be, for example, a Postscript interpreter or a PCL interpreter. Nevertheless, those skilled in the art will appreciate that other varieties of decomposers may be used as the decomposer 20 in the DFE 14. The DFE 14 also includes a service module 22. The service module 22 performs various services on behalf of the DFE 14. The service module 22 includes an internal frame store (IFS) 24 that is responsible for buffering the color separations that are provided from the decomposer 20 while processing occurs within the service module 22. The service module 22 includes a resource manager 26 that manages storage and access to the electronic precollation (EPC) subsystem 28 provided within the service module 22. The EPC subsystem 28 is responsible for storing documents in electronic form and precollating the pages of the document and color separations in a sequence so that the pages are ready to be output by the IOT 16. The EPC subsystem 28 may include both primary storage (such as RAM) and secondary storage (such as magnetic disk storage). The EPC subsystem 28 facilitates a "scan once, print many" mode of operation in which a document is scanned a single time and then printed multiple times by multiple IOTs. The service module 22 also includes other processing capabilities 30.

Those skilled in the art will appreciate that the depiction of the DFE 14 shown in FIG. 2 is intended to be merely illustrative and not limiting of the present invention. There is no need for the DFE 14 to be limited to the components depicted therein. Moreover, the service module 22 need not include an EPC subsystem 38. Furthermore, the components contained within the DFE 14 may be integrated into singular components or broken down into multiple sub-components.

Figure 3:
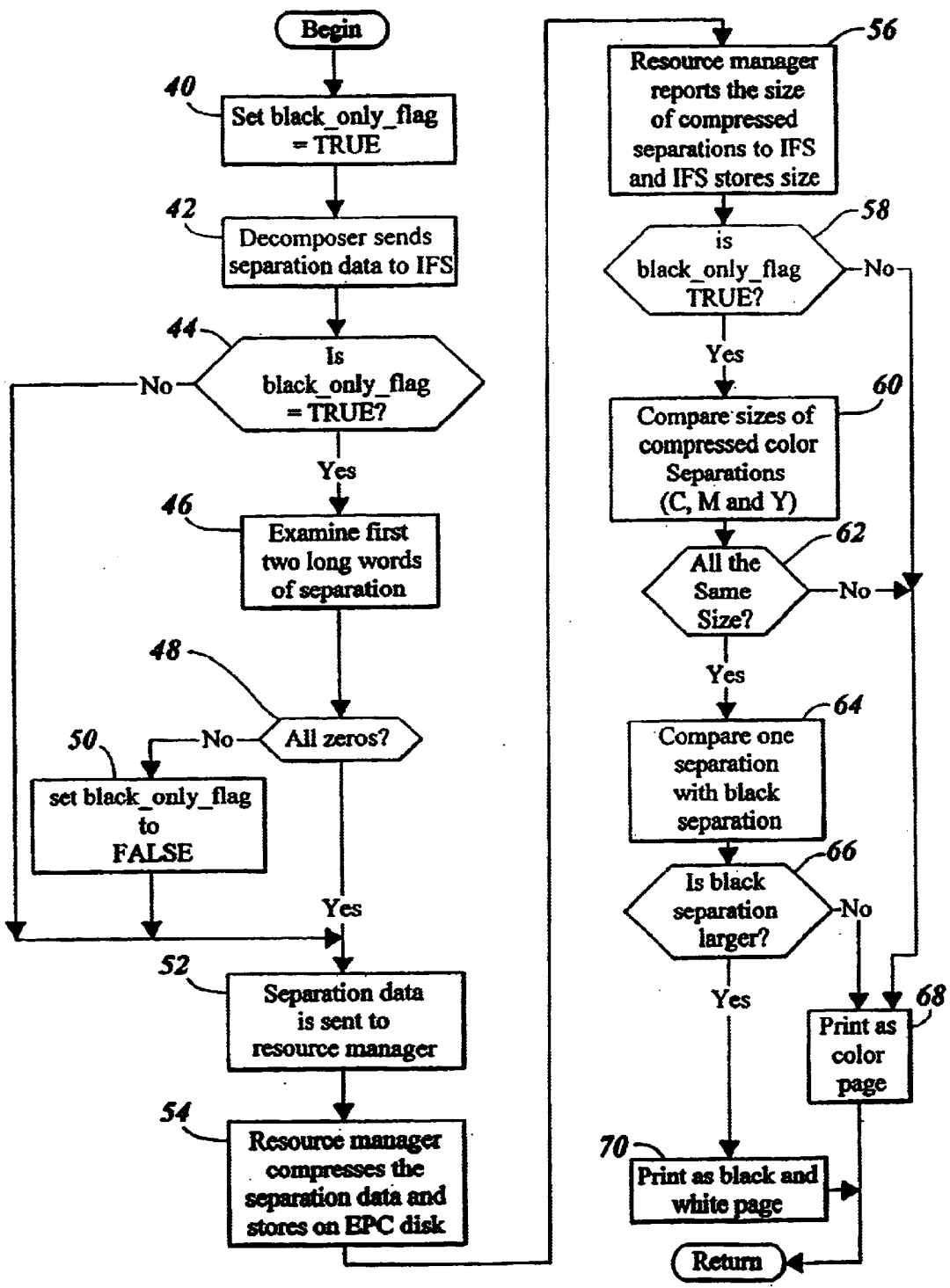
FIG. 3 is a flow chart illustrating the steps that are performed in the illustrative embodiment of the present invention to determine whether a page is to be printed as a color page or as a black and white page.

FIG. 3 is a flow chart depicting steps that are performed by the illustrative embodiment of the present invention to determine whether a page in a document is a black and white page or a full color page. The illustrative embodiment maintains a boolean black_only_flag variable that identifies whether the page is to be treated as a black and white page or a full color page. A value of "TRUE" for the black_only_flag variable indicates the page is to be printed as a black and white page. Initially, the black_only_flag variable is set as "TRUE" (step 40 in FIG. 3). As will be explained in more detail below, this value will be changed to "FALSE" if there is evidence that the page is not a black and white page. The decomposer 20 within the DFE 14 receives the page and decomposes the page into four color separations: a cyan color separation, a magenta color separation, a yellow color separation and a black color separation. The decomposer 20 sends these separations to the IFS 24 within the service module 22 (step 42 in FIG. 3). The IFS 24 buffers the color separation data while the color separation data for the page is processed.

A check is then made whether the black_only_flag variable has a "TRUE" value or a "FALSE" value (step 44 in FIG. 3). There may be instances where the DFE 14 is operating in a mode where it is presumed all of the pages are color pages. In such an instance, the black_only_flag variable has a value of "FALSE." The "FALSE" value indicates that the DFE 14 does not need to search for black and white pages in the document stream.

If the black_only_flag variable has a "TRUE" value (see step 44 in FIG. 3), a representative area (e.g., the first two long words or the eight bytes) of a designated one of the uncompressed color separations is examined (step 46 in FIG. 3). For instance, the first eight bytes of the uncompressed cyan color separation may be examined. A check is made whether all of the uncompressed examined bytes have a value of zero (step 48 in FIG. 3). A zero value for each of these bytes indicates that there is no cyan for any of the pixels associated with these bytes. In other words, there is no cyan color component in the page. For a color page, it is likely that one of these bytes will be non-zero; however, for a black and white page, these bytes should be all zero. If the bytes are not all zero, the black_only_flag variable is set to have a "FALSE" value (step 50 in FIG. 3). In contrast, if all of the examined bytes are zero, there is the possibility that the page is a black and white page. Thus, the analysis of the page continues. In either case, the separation data is sent to the resource manager 26 from the IFS 24 (step 52 in FIG. 3). The resource manager 26 compresses the separation data using a linear compression algorithm, such as a Lempel-Ziv compression algorithm (e.g., LZ77, LZ78 or LZW), which compresses the color data in the color separations in a lossless fashion. Those skilled in the art will appreciate that a number of other types of linear compression may be utilized. For example run length encoding may be used and various video compression techniques may be used. The compressed color separations are then forwarded to the EPC subsystem 28 to be stored on disk or on another type of storage medium (see step 54 in FIG. 3). The resource manager 26 reports the sizes of the compressed separations to the IFS 24, where the sizes are stored. The sizes of the compressed separations are used in the continued analysis of the selected page if the black_only_flag variable has a value of "TRUE" (see step 58 in FIG. 3). If the black_only_flag variable has a value of "FALSE," the page is designated and printed as a color page (step 68 in FIG. 3).

The analysis continues by comparing the sizes of the compressed separations (step 60 in FIG. 3). Specifically, the compressed sizes of the cyan color separation, magenta color separation and yellow color separation are compared (step 62 of FIG. 3). If the page is a black and white page, each of the compressed sizes should be the same, since these color separations should be all zeros prior to compression and compressed into like values of the same size. Thus, a comparison is made whether all of the compressions are the same size. If all of the compressed color separations are not the same size, the page is designated for printing as a color page (step 68 in FIG. 3). There may be instances where the compressed color separations are all the same size, but the page is not a black and white page. Thus, in step 64 of FIG. 3, one of the non-black color separations is compared with the black color separation to determine their relative sizes. With a black and white page, the black color separations should be larger than the non-black color separation. If the compressed black color separation is larger than the non-black compressed color separation (see step 66 in FIG. 3), the page is designated and printed as a black and white page (step 70 in FIG. 3). If the compressed black color separation is not larger than the non-black color separation, the page is designated and printed as a color page (step 68 in FIG. 3).

While the present invention has been described with reference to an illustrative embodiment thereof, those skilled in the art will appreciate that various changes in form and detail may be made without departing from the intended scope of the present invention as defined in the appended claims. For example, the image data may be encoded using a color model other than the CMYK color model. Further, the data that is examined may be located anywhere in the color separation rather than solely at the beginning of the cyan color separation.

What is claimed is:

1. A method for processing a selected page of a mixed document having at least one full color page and at least one black and white page, the selected page containing at least one of compressed color separation layers of cyan, magenta, yellow and black, comprising the steps of:

comparing the respective sizes of the compressed color separation layers to determine if the sizes are equal;

where the sizes of the compressed color separation layers are not equal, printing the selected page as a color page, otherwise comparing the size of the compressed black separation layer to one of the other compressed color separation layers; and where the compressed black separation layer is larger, printing the selected page as a black and white page.

2. The method of claim 1 wherein the apparatus is a print server.

3. The method of claim 1 further comprising the step of forwarding the selected page to the IOT for printing.

4. The method of claim 1 further comprising the step of decomposing the selected page into the color separations.

5. The method of claim 4 further comprising the step of decomposing a page of a document encoded in a page description language (PDL).

6. The method of claim 4 wherein the step of comparing includes analyzing the color data which includes examining a selected portion of the color data in a given one of the color separations to determine whether all of the color data for the selected portion has a same value.

7. A method for processing a selected page in a mixed document from a print source having a plurality of pages, comprising the steps of:

(a) sending the mixed document from the print source to a digital front end having a decomposer, an internal frame store, a resource manager, and an electronic precollation subsystem;

(b) decomposing the selected page into four color separation layers holding color data, the color separation layers being cyan, magenta, yellow and black;

(c) forwarding the color separation layer data to the internal frame store where the data is buffered;

(d) analyzing the color separation layer data received in the internal frame store to determine whether the selected page is a black and white page;

(e) where the selected page is determined to be a black and white page, analyzing a portion of a given color separation layer to determine whether all of the color separation layer data for the portion has the same value and then forwarding the color separation layer data to the resource manager;

(f) where the selected page is determined to be not a black and white page, forwarding the color separation layer data to the resource manager for further processing;

(g) compressing the color separation layers and reporting the size of the compressed color separation layers to the internal frame store;

(h) comparing the sizes of the compressed cyan color separation layer, the compressed magenta color separation layer, and the compressed yellow color separation layer to determine if the sizes of the compressed separation layers are equal;

(i) where the sizes of the compressed separation layers are not equal, printing the selected page as a color page;

(j) where the sizes of the compressed separation layers are equal, comparing the size of the compressed black color separation layer to one of the other compressed color separations layers;

(k) where the compressed black color separation layer is larger, printing the selected page as a black and white page;

(l) where the compressed black color separation is smaller, printing the selected page as a color page.

* * * * *